United States Patent [19]

Bowers

[11] Patent Number: 5,130,823
[45] Date of Patent: Jul. 14, 1992

[54] ERROR DIFFUSION SYSTEM

[75] Inventor: Harry Bowers, Fairfield, N.J.

[73] Assignee: Cactus, Santa Fe Springs, Calif.

[21] Appl. No.: 722,592

[22] Filed: Jun. 27, 1991

[51] Int. Cl.⁵ .............................................. G06K 9/40
[52] U.S. Cl. .................................. 358/465; 358/466; 358/455; 358/433
[58] Field of Search ............................ 358/432–433, 358/455–458, 465–467, 482–483

[56] References Cited

U.S. PATENT DOCUMENTS

| | | | |
|---|---|---|---|
| 4,196,454 | 4/1980 | Warren | 358/456 |
| 4,205,341 | 5/1980 | Mitsuya et al. | 358/433 |
| 4,339,774 | 7/1982 | Temple | 358/283 |
| 4,419,696 | 12/1983 | Hamano et al. | 358/466 |
| 4,466,021 | 8/1984 | Hibbard | 358/483 |
| 4,654,721 | 3/1987 | Goertzel et al. | 358/283 |
| 4,891,714 | 1/1990 | Klees | 358/456 |
| 4,958,238 | 9/1990 | Katayama et al. | 358/456 |
| 4,962,542 | 10/1990 | Klees | 382/54 |
| 4,975,786 | 12/1990 | Katayama et al. | 358/459 |
| 5,008,950 | 4/1991 | Katayama | 358/455 |

OTHER PUBLICATIONS

"Color Compulsive Error Diffusion", by John C. Dalton, *SPSE Advances in Non-Impact Printing Technologies*, pp. 59–60 (1984).
"Error Diffusion Using Random Field Models", by John C. Dalton et al., pp. 333–339.
"Digital HalfToning Using Biased Error Diffusion", by D. Anastassiou, IBM Technical Disclosure Bulletin, vol. 26, No. 10B, Mar. 1984.
"Digital HalToning", by Robert Ulichney, *Massachusetts Institute of Technology*, Section 8.2, pp. 239–252, 1987.

Primary Examiner—Stephen Brinich
Attorney, Agent, or Firm—Majestic, Parsons, Siebert & Hsue

[57] ABSTRACT

For highlight or dark areas of images, the error terms diffused to neighborhood pixels include components which are periodic with respect to a wavelength where the wavelength is a function of the density level of the pixels from which the error terms are diffused. In this manner, patterned artifacts or "worms" in the highlight or dark areas of the images are reduced or illuminated.

23 Claims, 11 Drawing Sheets

PHOTOSHOP

ERROR DIFFUSION SYSTEM

BACKGROUND OF THE INVENTION

This invention relates in general to digital halftone systems and in particular, to an improved digital halftone system using error diffusion.

In the conventional printing process, continuous tone images are prepared for printing by exposure through a halftone screen. The resultant image will have dots of various sizes, one for each opening in the screen. These dots are larger where more light penetrates the screen and smaller where less light is present. Thus the exposure through the screen converts intensity level of the original image at the opening in the screen into a dot of appropriate diameter or size. In the digital analog of the above process, known as digital halftoning, the original image is scanned with a scanner and the data is captured in a digital computer. This data consists of binary representations of the scanned intensity or density values. Each such value, typically ranging from 0 to 255, corresponds to one scanned area or pixel of the input image. To reproduce this image on a printer capable of only printing colored dots, it is necessary to create a sensation of intensity by suitable choice of the dots to be printed.

In digital halftoning, a multi-level or continuous tone original image is scanned pixel by pixel. Signals representing the density levels of the pixels or blocks of pixels scanned are processed to provide a bi-level output for a printer. In response to the bi-level output, the printer would either print a dot or not to provide an image resembling the original.

Two types of digital halftoning techniques have been used. In one of the two types known as screening or dithering, the signals representing the density levels of the pixels or blocks of pixels of the original image scanned are multiplied by or compared to signals representing a two-dimensional screen function to provide the bi-level output. In response to the bi-level output, the printer will print or not print dots at fixed output positions. In the other type known as error diffusion, no screening function is used. Instead, the error that results in quantizing the density level of a pixel or a block of pixels (i.e. converting to a bi-level output) is taken into account when pixels or blocks of pixels in a neighborhood are subsequently converted into bi-level outputs (i.e. diffused to neighborhood pixels or blocks).

In contrast to screening or dithering, in error diffusion systems, the printer is not caused to print dots in fixed output positions; instead, the printer may print dots at whatever locations selected, and indeed the density level desired is achieved by selecting the appropriate dot spacing or wavelength corresponding to the scanned density level. Usually, the wavelength of dots to be printed by the printer varies inversely with the density level of the pixel or block of pixels scanned from the original image. Hence, when the input signal indicates a change in density level of the scanned original, the wavelength of dots to be printed also changes. The wavelength of dots to be printed as a function of the density level of the scanned image may be stored in a lookup table in the computer memory.

Thus, if the scanned density level ranges from 0 to 255, and the particular density level of the scanned image has the value "1," this means that one dot should be printed in a 16×16 array so that one dot should be printed on every sixteenth position in the printing direction by the printer. This in turn defines a dot wavelength of 16. In error diffusion techniques, the dot size is typically fixed, unlike screening and dithering techniques.

Error diffusion was first proposed by R. W. Floyd and L. Steinberg. Such technique is described in some detail in Section 8.2, pages 239-252 of the book "Digital Halftoning," by Robert Ulichney, *Massachusetts Institute of Technology*, 1987. One example of such error diffusion and algorithm proposed by Floyd and Steinberg is illustrated in FIG. 8.6(a) of Ulichney, where a rectangular grid is used in printing. Such figure shows the proportions of the error distributed to neighboring pixels when the density level at the pixel represented by the black dot is converted to a bi-level output. An error term given by 7/16th of the quantization error is distributed to the next pixel immediately to its right on the same line for printing. A weighted error given by 1/16th of the quantization error is distributed to the pixel immediately beneath the prior pixel to which error has been distributed and 5/16th and 3/15th of the quantization error are distributed to the two pixels immediately to the left, all as shown in FIG. 8.6(a) of Ulichney. This operation is known as an error filter, where weighted portions of the quantization error are distributed to four pixels as shown. It is noted that the four weights (7/16, 1/16, 5/16 and 3/16) add up to "1." When the pixel shown by the black dot is to be converted to a bi-level output, the density level of the pixel scanned is compared to a threshold (such as "128" for full range of density levels from "0" to "255"). When the density level is beneath the threshold, the printer is commanded to print a dot at such location and the quantization error is equal to the input signal representing th density level. If the input signal is greater than the threshold, then no dot is printed and the error is given by the difference between the maximum value (e.g., "255") and the input signal representing the density level of the scanned pixel. In other words, if the scanned density level at the pixel in the "x, y" position is Pval(x, y) and the converted bi-level output of the pixel is Pout(x, y), where the density level is in the range from "0" to "255," and the threshold is "T," then if Pval(x, y)<T, then
Pout(x, y)=color, and
Error=Pval (x, y); but
if Pval(x, y)>T, then
Pout(x, y)=white, and
Error=Pval(x, y)−255.

The error is then distributed to surrounding pixels in the manner described above.

A number of methods have been proposed for allocating the quantization error in error diffusion. In many error diffusion methods, the error is divided into fixed proportions. The Floyd and Steinberg technique described above is one example. The halftone pictures produced by such methods produce output pattern artifacts consisting of apparent curved or straight lines, known to the industry as "worms."

To reduce or eliminate the "worms," many solutions have been proposed. In U.S. Pat. No. 4,654,721 to Goertzel et al., a random fraction of the error is distributed to one neighboring block and the remainder is distributed to another neighboring block. In the article "Error Diffusion Using Random Field Models," by J. C. Dalton et al., Markov random field error diffusion algorithm is used to generate random textures for eliminating grain boundary errors associated with conventional error diffusion textures in large constant tone regions.

None of the above-described error diffusion techniques are entirely satisfactory. In particular, the highlight or dark areas where the density levels of scanned images are either very high or very low, the above-referred to patterned artifacts or "worms" are particular noticeable, even when the above-described known error diffusion techniques are employed. It is therefore desirable to provide an error diffusion system for halftoning in which the above-described difficulties are alleviated.

SUMMARY OF THE INVENTION

This invention is based on the observation that, particularly for highlight portions and for dark portions of an image, the patterned artifacts or "worms" are reduced by introducing periodicity in the weighting factors for distributing errors to neighboring pixels. Thus, where the density level of a scanned pixel or block of pixels is within a certain range or ranges of values, periodicity is introduced into the weights for deriving the error terms for distribution to neighboring pixels or blocks in the manner described below.

When the density level of a pixel or a block of pixels is within a predetermined range or ranges of values, the weights used in error diffusion are such that the derived correction terms of such pixel or block have components that vary with respect to the position of the pixel or block of pixels and that are periodic with respect to a wavelength which is a function of the density level or corrected density level of said pixel or block.

One aspect of the invention is directed towards an apparatus for converting a multiple level digital or continuous tone original image into a bi-level image. In this apparatus, quantization errors in converting density levels of pixels or blocks of pixels of the image are distributed to neighborhood pixels or blocks of pixels. The apparatus comprises a scanner for scanning the original image to detect the density levels of pixels or blocks of pixels within a predetermined range of optical wavelengths, means for adding to the density level of each of a plurality of pixels or blocks of pixels scanned an error correction term to provide a corrected density level for said pixel or block of pixels. The apparatus further comprises means for comparing the corrected density level of each of said pixels or blocks of pixels to a predetermined threshold, and for providing a bi-level output corresponding to the pixel or block of pixels to convert said pixel or block. In the preferred embodiment, this threshold is chosen from a number of randomly variable threshold values evenly distributed around a predetermined value. The apparatus also includes means for deriving from the corrected density level of each of said pixels or blocks or pixels and the bi-level output error correction terms of such pixels or block of pixels for distribution to at least two neighborhood pixels or block of pixels of such pixel or block of pixels. For at least one converted pixel or block of pixels whose density level or corrected density level is in a predetermined range, the correction term of such pixel or block has a component that varies with respect to the position of the pixel or block of pixels and that is periodic with respect to a wavelength which is a function of the density level or corrected density level of said pixel or block.

The method of this invention comprises scanning the original image to detect the density levels of pixels or blocks of pixels within a predetermined range of optical wavelengths, adding to the density level of each of a plurality of pixels or blocks of pixels scanned an error correction term to provide a corrected density level for said pixel or block of pixels to convert said pixel or block. The corrected density level of each of said pixels or blocks of pixels is then compared to a predetermined threshold, and a bi-level output is provided corresponding to the pixel or block of pixels. In the preferred embodiment, this threshold is chosen from a number of randomly variable threshold values evenly distributed around a predetermined value. The method further comprises deriving from the corrected density level of each of said pixels or blocks of pixels and the bi-level output, error correction terms of such pixel or block of pixels for distribution to at least two neighborhood pixels or blocks of pixels of such pixel or block. For at least one converted pixel or block of pixels whose density level or corrected density level is in a predetermined range, at least one of the correction terms of such pixel or block has a component that vary with respect to the position of the pixel or block of pixels and that is periodic with respect to a wavelength which is a function of the density level or corrected density level of said pixel or block.

DETAILED DESCRIPTION OF THE PREFERRED EMBODIMENT

Figure 1:
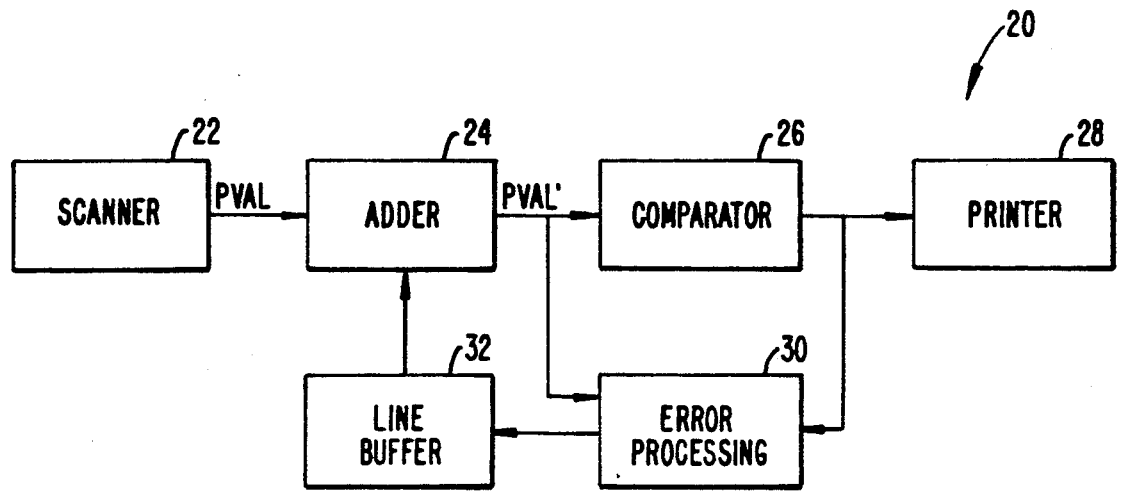
FIG. 1 functional block diagram of a system for converting a multiple level digital or continuous tone original image into a bi-level image to illustrate the embodiment of the invention.

FIG. 1 is a functional block diagram of a system for converting a multiple level digital or continuous tone original image into bi-level image. System 20 includes a scanner 22 for scanning the original image to provide a signal Pval of a pixel or a block of pixels of the image scanned by the scanner indicating the density level of the pixel or block scanned. Adder 24 adds to the signal Pval an error correction term described below to provide a signal Pval' representing the corrected density level of the pixel or block scanned. These steps are indicated by blocks 50 and 52 of FIG. 3.

Figure 3:
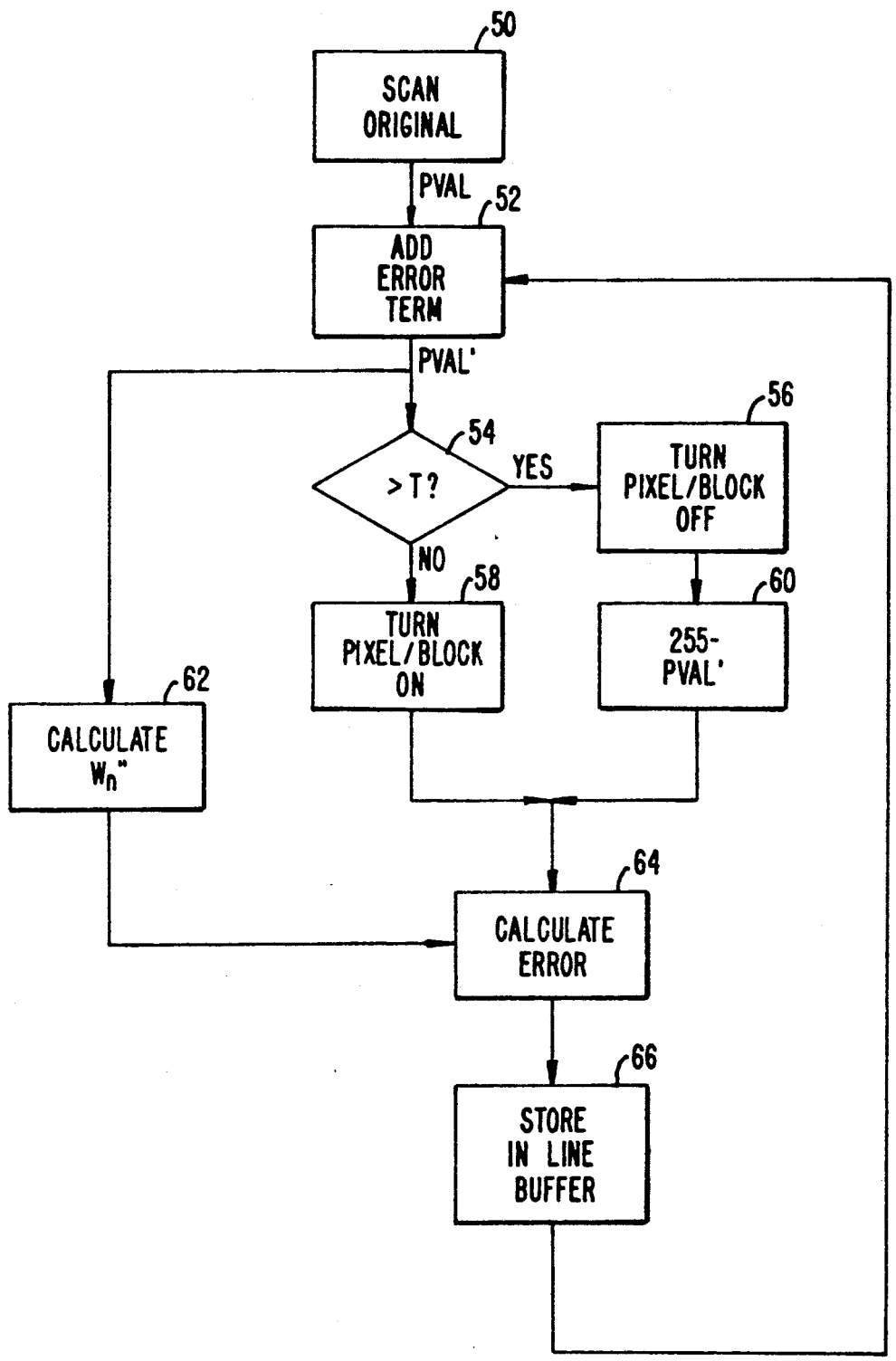
FIG. 3 is a flow chart to illustrate the operation of the system of FIG. 1.

Comparator 26 then compares the signal Pval' to a threshold T having a predetermined value (diamond 54 of FIG. 3). In the preferred embodiment, T is one of a number of randomly variable threshold values evenly distributed around a predetermined value such as 128 in a range of density values from 0 to 255. If Pval' is greater than the threshold, the pixel or block is turned off and printer 28 is instructed to not print a colored dot at such pixel or block position (block 56 of FIG. 3). If Pval' is lower than the threshold, the pixel or block is turned on and printer 28 is instructed to print a colored dot at such pixel position (block 58 of FIG. 3). The bi-level output of comparator 26 and the corrected density level Pval' are supplied to error processing unit 30 to calculate the error terms of the converted pixel or block of pixels just described for distribution to at least two neighborhood pixels or blocks of pixels of such converted pixel or block.

Error processing unit 30 performs the operations indicated in blocks 60–64 of FIG. 3. These error terms are then stored in line buffer 32. When the scanned density level Pval of a neighboring pixel or block is scanned by scanner 22 and provided to adder 24, the correction term stored in buffer 32 corresponding to such pixel or block is then fetched from buffer 32 and added to the input signal to derive a corrected density level Pval'. Thus as shown in FIG. 3, blocks 66 and 52, the correction terms for neighboring pixels or blocks derived by error processing unit 30 are stored in the line buffer which are then provided to adder 24 when the signals representing the density levels of such neighboring pixels or blocks are processed by adder 24.

Figure 2:
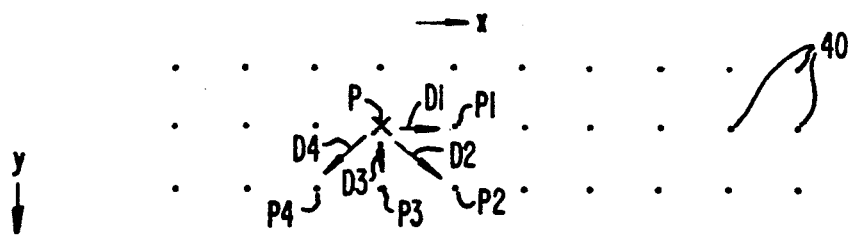
FIG. 2 is a schematic view of pixel positions of an image to illustrate the error diffusion technique of this invention.

FIG. 2 is a schematic diagram of dots printed by a printer in a rectangular grid to illustrate the invention. As shown in FIG. 2, printer 28 (not shown in FIG. 2) is capable of printing a two-dimensional array of dots such as dots 40 shown in FIG. 2. To simplify the drawing, the dots 40 shown are much smaller than their actual size; when all of the dots 40 are actually printed, the whole area of the image shown in FIG. 2 will be of a particular color from the colorant that is being printed. The printer prints one dot at a time so that the two-dimensional array shown in FIG. 2 is printed one row at a time, for example, from top to bottom in the y direction and the dots in each row are printed, for example, from left to right in the "x" direction. After the printer has finished printing one row of pixels, the printer would then move in the y direction to the next row to print the next row of dots in the "x" direction.

When system 20 of FIG. 1 processes the conversion of the density level at point P in FIG. 2, system 20 derives correction terms which are distributed to points P1, P2, P3 and P4, the same four points to which errors are diffused or distributed as proposed by Floyd and Steinberg. The error terms to be distributed to these four points are obtained by multiplying by certain weights the quantization error which results when comparator 26 converts the density level of the pixel P to a bi-level output. In reference to blocks 54–60 of FIG. 3, where the density level is less than the threshold, and the pixel or block is turned on, then the density level itself is the error. On the other hand, where the density level is greater than the threshold so that the pixel or block is turned off, the difference between the maximum value of the density level (255 in this case) and the actual density level at pixel P is the error and is derived in accordance with block 60. This error term may be derived in unit 30 by subtracting the output of comparator 26 and the corrected density level Pval', where the output of comparator 26 is a "1" or a "0" and the corrected density level Pval' is normalized as a fraction of the maximum value of the density level (255 in this case). Such difference is then multiplied by a weight characteristic of the direction of distribution. Thus if the distribution is in the direction D1, the weight is $w_1$, or in general where the distribution is in the direction $D_n$, the weight applied is $w_n$, where n ranges from "1" to "b 4."

In reference to FIG. 2, the four error terms to be distributed to the four points P1, P2, P3, P4 are respectively: $w_1$·"error", $w_2$·"error", $w_3$·"error" and $w_4$·"error", where "error" is computed as described above by computing the difference between the output of comparator 26 and the normalized output of adder 24. Then these four error terms are stored in line buffer 32. When scanner 22 provides the scanned density level at the next pixel P1 to adder 24, the error term $w_1$·"error" is fetched from buffer 32 and is added to the density level scanned to provide the corrected density level for P1 at the output of adder 24 to be processed in the same manner as described above.

It will be noted that, when the density level scanned for point P1 is processed, the total correction at points P2, P3 will be updated by adding to each correction term stored in the line buffer for each of the two points, the additional correction term that is derived when the density level at point P1 is being converted to bi-level. This is repeated until the density level at point P3 or point P4 is scanned and processed, at which time the cumulative correction terms are then added by adder 24 to provide a corrected density level, which is then processed as before to provide a bi-level output and to carry on further error processing.

As noted above, the weights $w_1$, $w_2$, $w_3$ and $w_4$ in conventional error diffusion systems, such as those by Floyd and Steinberg, have fixed values. As noted by Goertzel et al. referenced above, such error diffusion schemes give rise to patterned artifacts or "worms." This invention is based on the observation that these "worms" can be reduced or even eliminated in the light or dark areas of a picture by introducing a certain amount of periodicity to the location of the dots printed by the printer. This reduces the patterned artifacts or "worms," particularly in the highlight portions or dark portions of a picture reproduced in digital halftone. In the preferred embodiment of the invention, this is achieved by detecting whether the scanned density level of a pixel or block of pixels is above a certain value such as "192" or below a certain value such as "63," where the density level may range from "0" to "255." Where the density level scanned is detected to be within either range, the weights $w_1$, $w_2$, $w_3$ and $w_4$ are made to include a component which varies with the position of the pixel or block and which is periodic with respect to a wavelength which is a function of the density level or corrected density level of such pixel or block for the purpose of calculating error correction terms for neighboring pixels or blocks. In other words, where a corrected density level of a scanned pixel is detected to be in the highlight or dark areas of the image, then the weights have periodic components with respect to wavelengths that are functions of the corrected density level. These operations are illustrated by reference to FIGS. 3–7.

Block 62 of FIG. 3 is illustrated in more detail in FIGS. 4–7. In the preferred embodiment, at least one of the four weights $w_1$, $w_2$, $w_3$ and $w_4$ is a sine function of the location of the pixel or block to be converted, where the sine function is periodic with respect to a wavelength which is a function of the corrected density level. In one embodiment, the four weights $w_1$, $w_2$, $w_3$ and $w_4$ have the following values:

$$\lambda = f_\lambda (Pval') \qquad (1)$$

$$x = \lambda/2 - (I \bmod \lambda) \quad (2)$$

$$sf = \pi/2 - 2\pi x/\lambda \quad (3)$$

$$w_4 = [\sin(sf) + 1] * 0.5 \quad (4)$$

$$w_1 = 1 - w_4 \quad (5)$$

$$w_2 = 0 \quad (6)$$

$$w_3 = 0 \quad (7)$$

Figure 4:
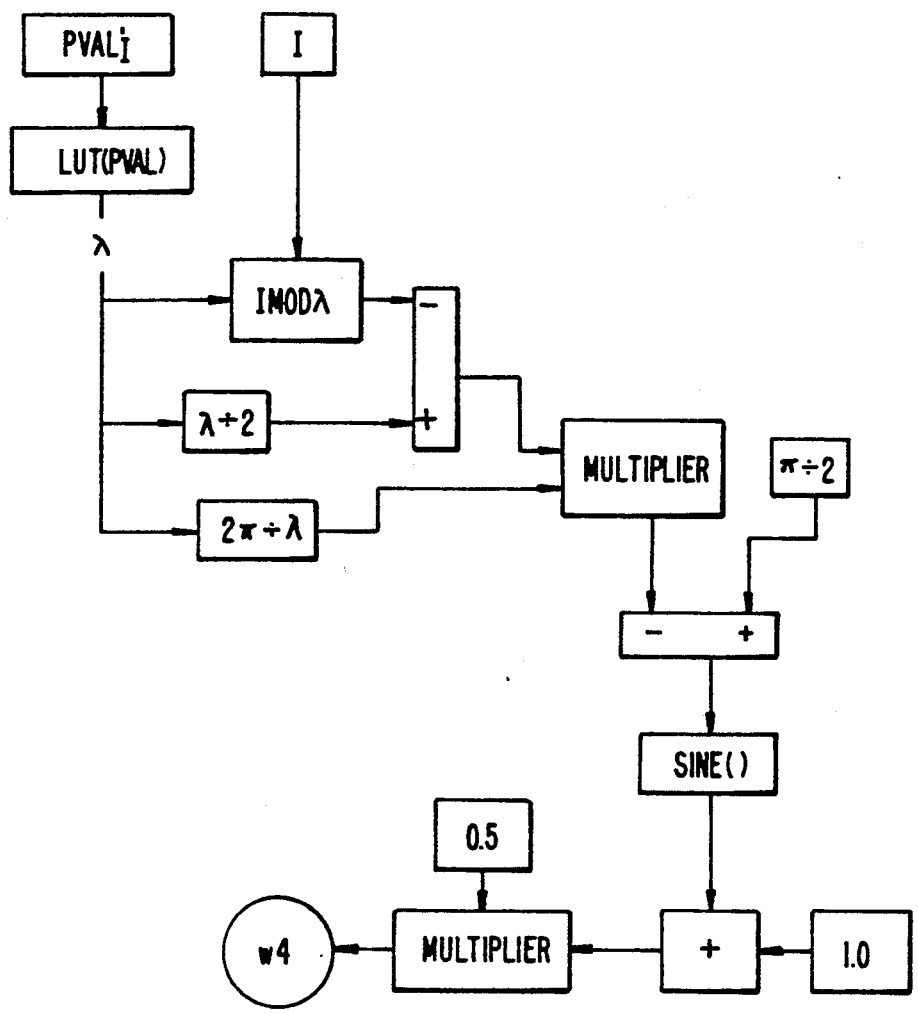
FIGS. 4–7 are system diagrams to illustrate the operation of the system of FIG. 1.
Figure 5:
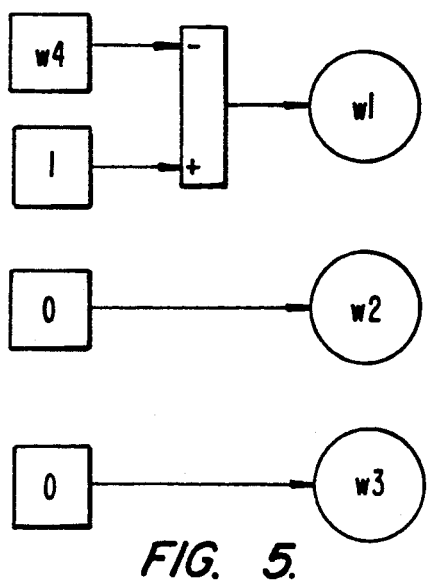

The derivation of the four weights $w_1$, $w_2$, $w_3$ and $w_4$ may be accomplished by means of the systems in FIGS. 4 and 5.

In the above equation, I is the distance of pixel P from the y axis. The wavelength $\lambda$ of dots to be printed can be fetched from a lookup table as a function of the corrected density level Pval'. The dot pattern printed by the printer at such location therefore repeats for every half of the wavelength $\lambda$. The weight $w_4$ is therefore a sine function of the position of the pixel or block and is periodic with respect to a wavelength $\lambda$ which is a function of the corrected density level of the pixel or block. The expression for weight $w_4$ is designed to ensure that the weight does not go negative.

The above-described weights with periodicity are introduced only when the corrected density level is above a certain value such as "192" for a highlight area or below a certain value such as "63" for a dark area of an image.

As noted above, introducing periodicity in the correction term may be desirable only when the corrected density level of pixels or blocks of pixels are within certain range of values. When the corrected density levels are outside such ranges, it may be desirable for the weights to remain constant, as in the conventional error diffusion approach. The invention is best illustrated by reference to an example below, where periodicity is introduced in the correction terms when the corrected density level is in the range of "192" to "255," that is, in the highlight portion of the image. It will be understood, however, that the invention is readily applicable to a dark area, where the corrected density level is below a certain value, such as "63;" all such variations are within the scope of the invention.

Thus, if the corrected density level Pval' is within the range of "192" to "255," each of the four weights used in computing the four correction terms will have a component which is periodic with respect to the wavelength of dot density as discussed above. In the preferred embodiment, and for such corrected density levels, the four weights also have constant components that do not vary as a function of the position of the pixel or block of the wavelength, so that the weights employed are each a blend of a periodic component and a constant component. One implementation that has been found to be satisfactory is illustrated by the equations below, where "temp" is a fraction to indicate how far the corrected density value Pval' is above the limit "192," $w_1''$, $w_2''$, $w_3''$ and $w_4''$ are the weights that are used to derive the four error correction terms for error distribution in the directions D1, D2, D3, D4 as shown in FIG. 2, $w_1'$, $w_2'$, $w_3'$ and $w_4'$ are constants, and $w_1$, $w_2$, $w_3$ and $w_4$ are given by equations 4-7 above.

If $255 > \text{Pval}' \geq 192$, $$\text{temp} = \text{Pval}' - 192/63 \quad (8)$$

$$w_1'' = (1 - \text{temp}) * w_1' + w_1 * \text{temp} \quad (9)$$

$$w_2'' = (1 - \text{temp}) * w_2' + w_2 * \text{temp} \quad (10)$$

$$w_3'' = (1 - \text{temp}) * w_3' = w_3 * \text{temp} \quad (11)$$

$$w_4'' = (1 - \text{temp}) * w_4' = w_4 * \text{temp} \quad (12)$$

If Pval' $\leq$ 192, $$w_1'' = w_1' \quad (13)$$

$$w_2'' = w_2' \quad (14)$$

$$w_3'' = w_3' \quad (15)$$

$$w_4'' = w_4' \quad (16)$$

From equations 8-16 above, it will be evident that, where the corrected density level Pval' is equal to "192," the two sets of equations would give the same result, namely that $w_1''$, $w_2''$, $w_3''$ and $w_4''$ are constants each equal to the corresponding one of $w_1'$, $w_2'$, $w_3'$ and $w_4'$. In this manner, the transition from ordered grid-like behavior to a more classical error diffusion is accomplished by blending the two sets of weighting factors $w_n$ and $w_n'$.

The above equations need only be modified slightly for application to dark areas of the picture instead highlights. Thus if Pval is detected to be less than or equal to 63, then temp is defined by (63-Pval')/63, and equations 9-12 remain unchanged. If Pval' is equal to or greater than 63, then equations 13-16 still apply. In general, in the equations for both the highlight and dark areas of the image, temp may be defined as the absolute value of (first value – Pval')/(first value – second value), where the first and second values are 192, 255 respectively for equations applicable to the highlight areas and 63, 0 respectively for equations applicable to the dark areas.

Figure 6:
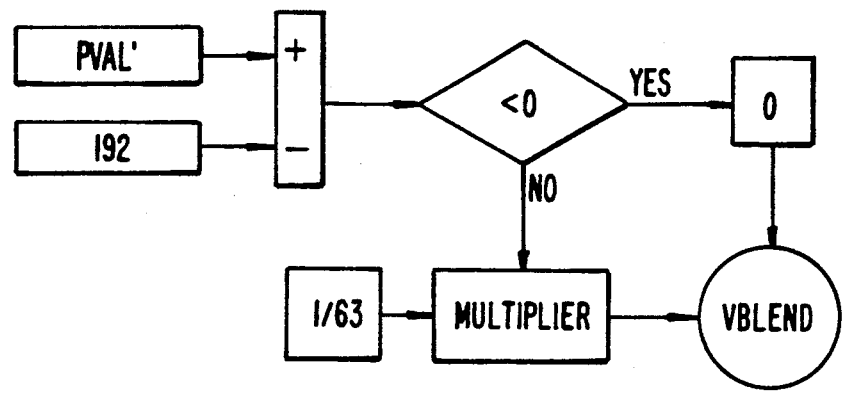
Figure 7:
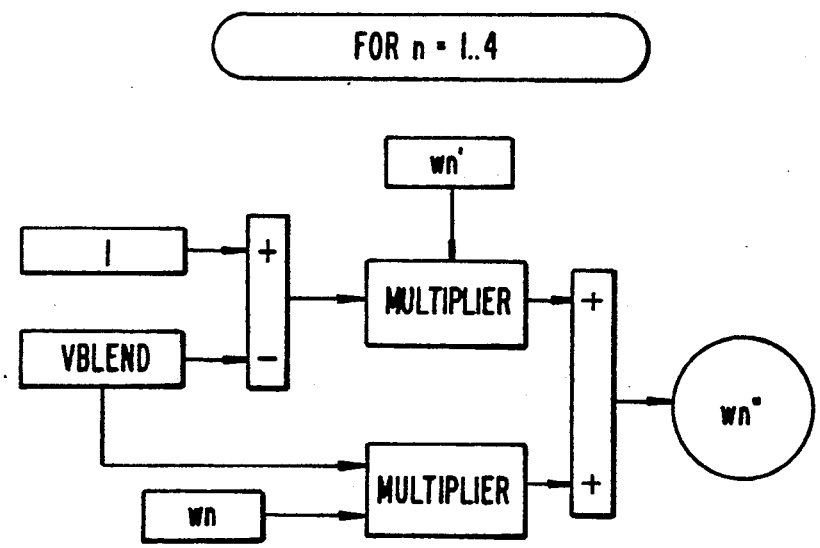

FIGS. 6 and 7 together with FIG. 3 illustrate a system for computing the correction terms to implement the above equations. As shown in FIGS. 1 and 3, the corrected density level Pval' is provided to error processing unit 30 for calculating the weights $w_1''$, $w_2''$, $w_3''$ and $w_4''$. As shown in FIG. 6, error processing unit 30 performs the following operations. The number "192" is subtracted from the corrected density level Pval' and the result is checked. If the result is negative, the quantity Vblend is set to "0." If the quantity is smaller than "0," it is divided by "63" which then becomes the value of Vblend, which is the same as the quantity "temp" in equations 8-12 above. The above computed value of Vblend is then used in FIG. 7 to derive the four weights $w_1''$, $w_2''$, $w_3''$ and $w_4''$. As shown in FIG. 3, each of the four weights $w_1''$, $w_2''$, $w_3''$ and $w_4''$ is used to multiply the error derived in blocks 54–60 in FIG. 3 to obtain the four error correction terms for distribution in directions D1-D4 in FIG. 2. These four correction terms are then stored in buffer 32 for later use. The above described process needs to be modified only slightly to derive the four correction terms for error diffusion correction in dark areas of the image. For example, in FIG. 6, Pval' should be subtracted from 63 (instead of subtracting 192 from Pval') and divided by 63 for deriving vblend instead when Pval' is detected to be within the range 0 to 63.

It is found that the following values for $w_1'$, $w_2'$, $w_3'$ and $w_4'$ yields reproduced digital halftone images having pleasing visual effects: $w_1'$ and $w_3'$ being equal to 0.3 and $w_2'$ and $w_4'$ equal to 0.2.

While the invention has been described above by referenced to a scheme where correction terms are distributed to four neighborhood pixels or blocks, it will be understood that a different number of correction terms may be derived for distribution to a different number of neighborhood of pixels or blocks, such as deriving at least two correction terms for at least two neighborhood pixels or blocks. Preferably, the at least two pixels or blocks to which the error correction terms are to be distributed are not collinear with the pixel or block from which the error correction terms are derived. Thus in FIG. 2, if error correction terms are to be distributed to only two of the points P1–P4, it is preferable for such two points and point P not to be collinear. While in the preferred embodiment described above, the corrected density value Pval' is used for deriving the error correction term, it will be understood that the uncorrected density value may be used instead and is within the scope of the invention.

Figure 8:
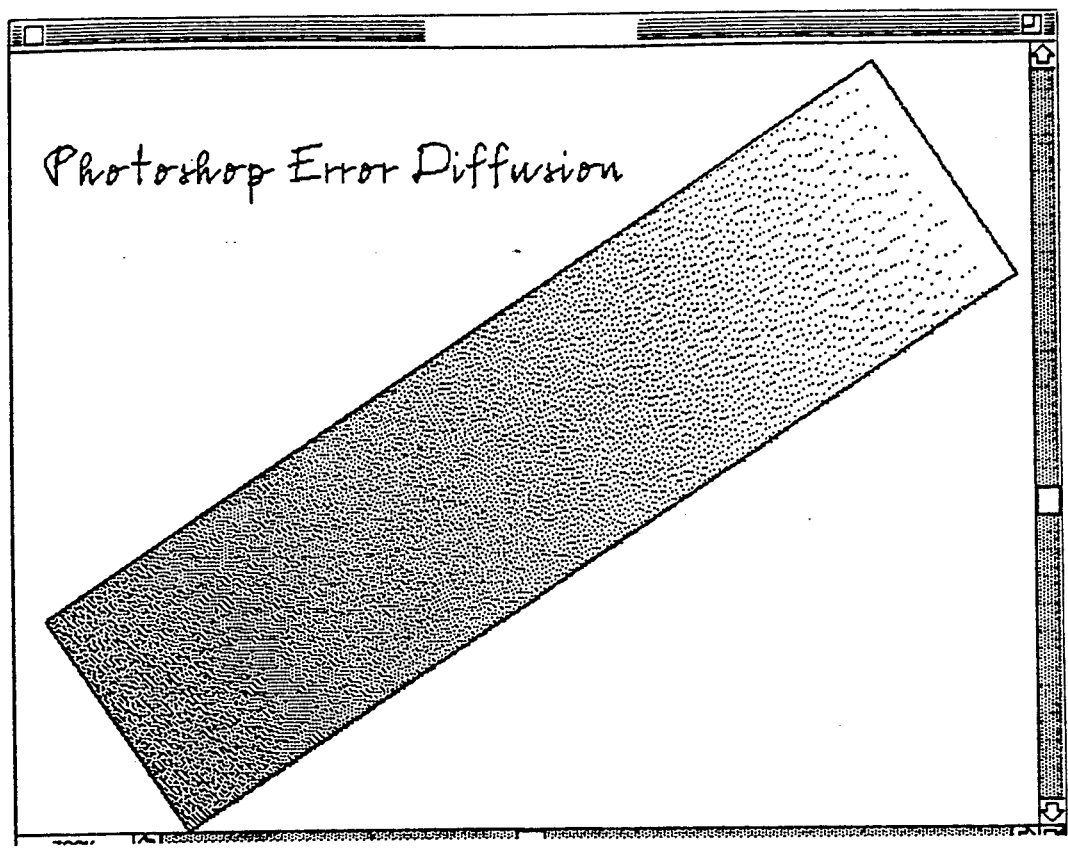
FIGS. 8–10 are bi-level images produced using conventional error diffusion techniques proposed by Floyd and Steinberg and FIGS. 11–13 are the bi-level renditions of the same pictures using the techniques of this invention to illustrate the advantages of the invention.
Figure 9:
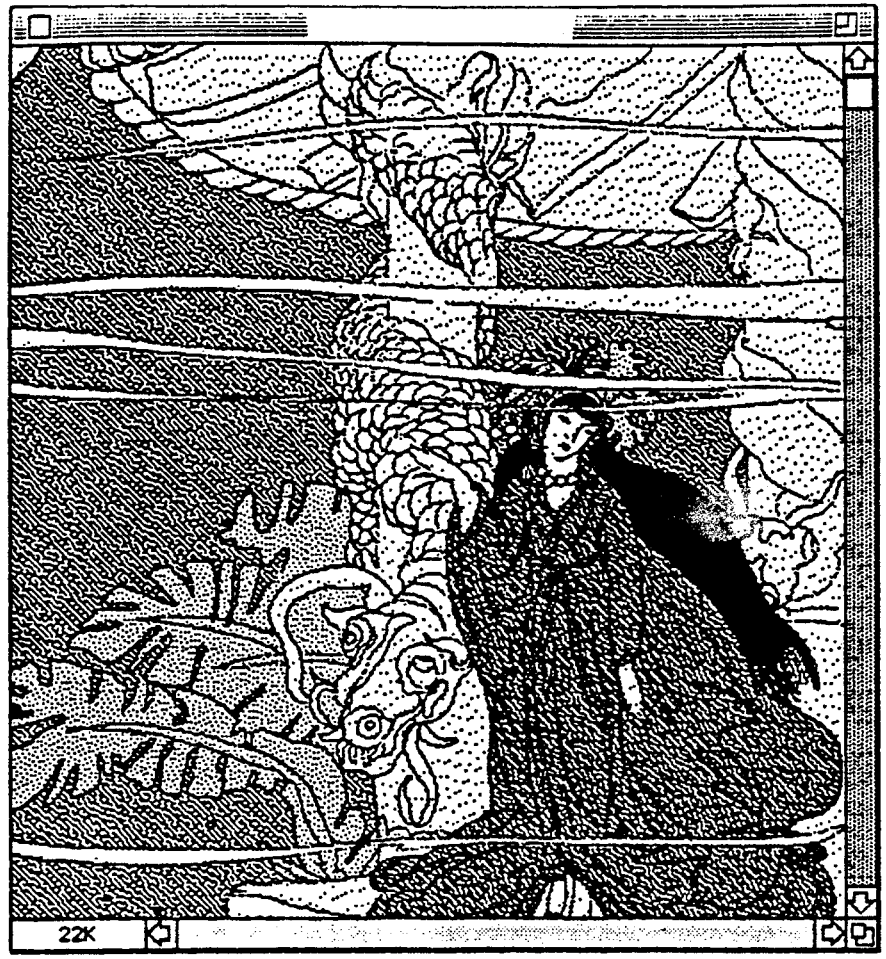
Figure 10:
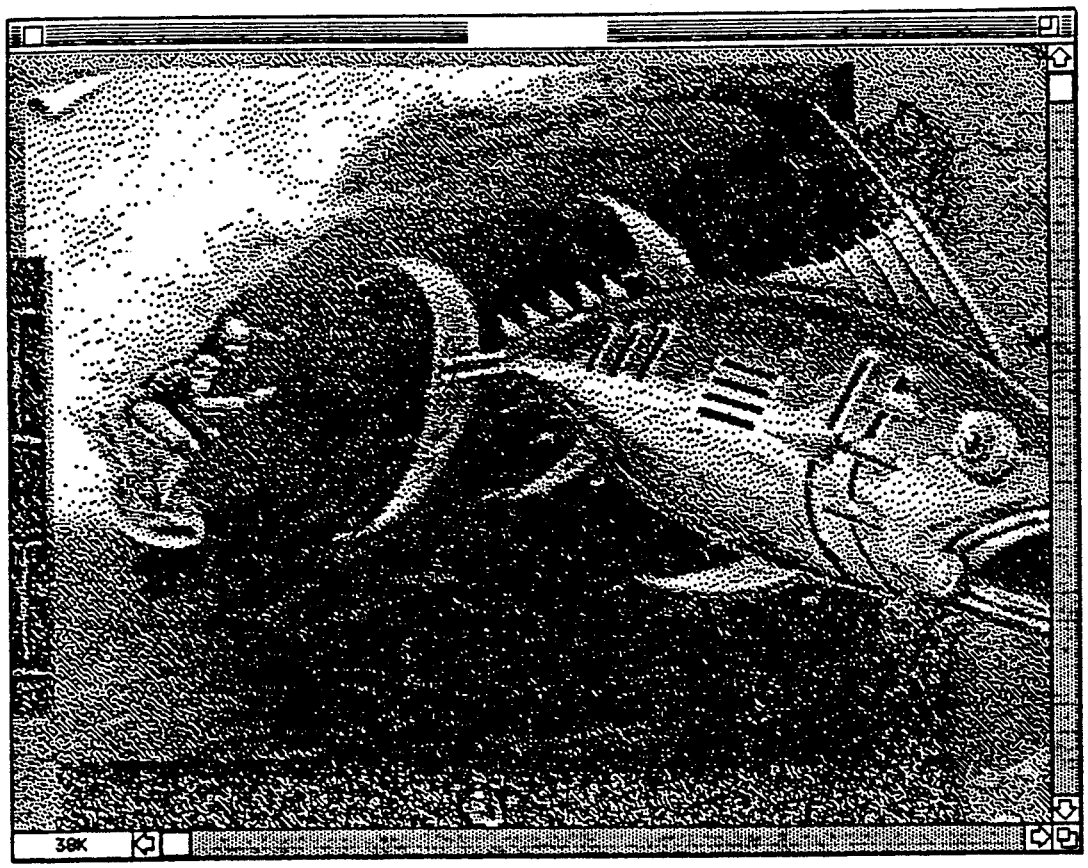
Figure 11:
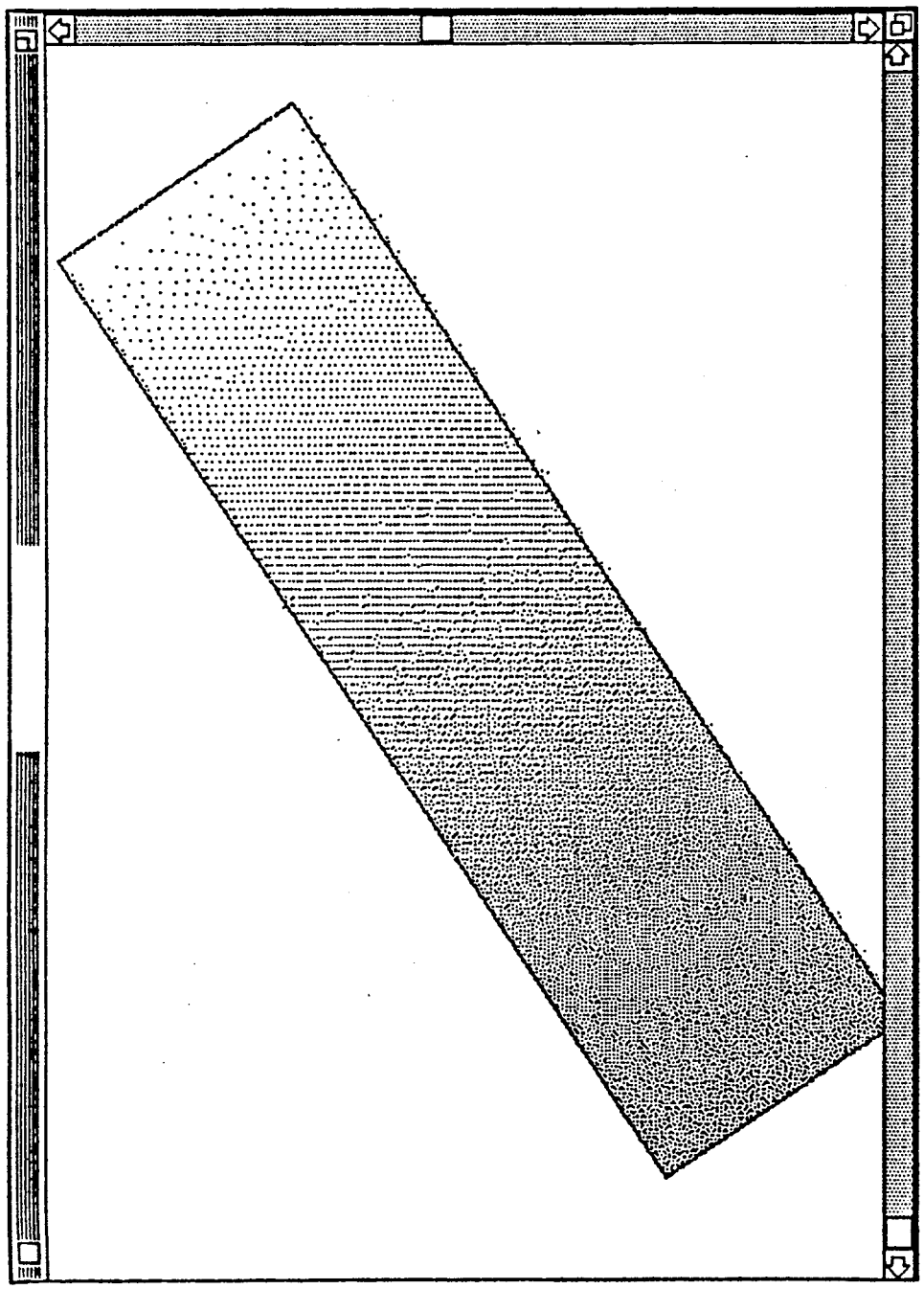
Figure 12:
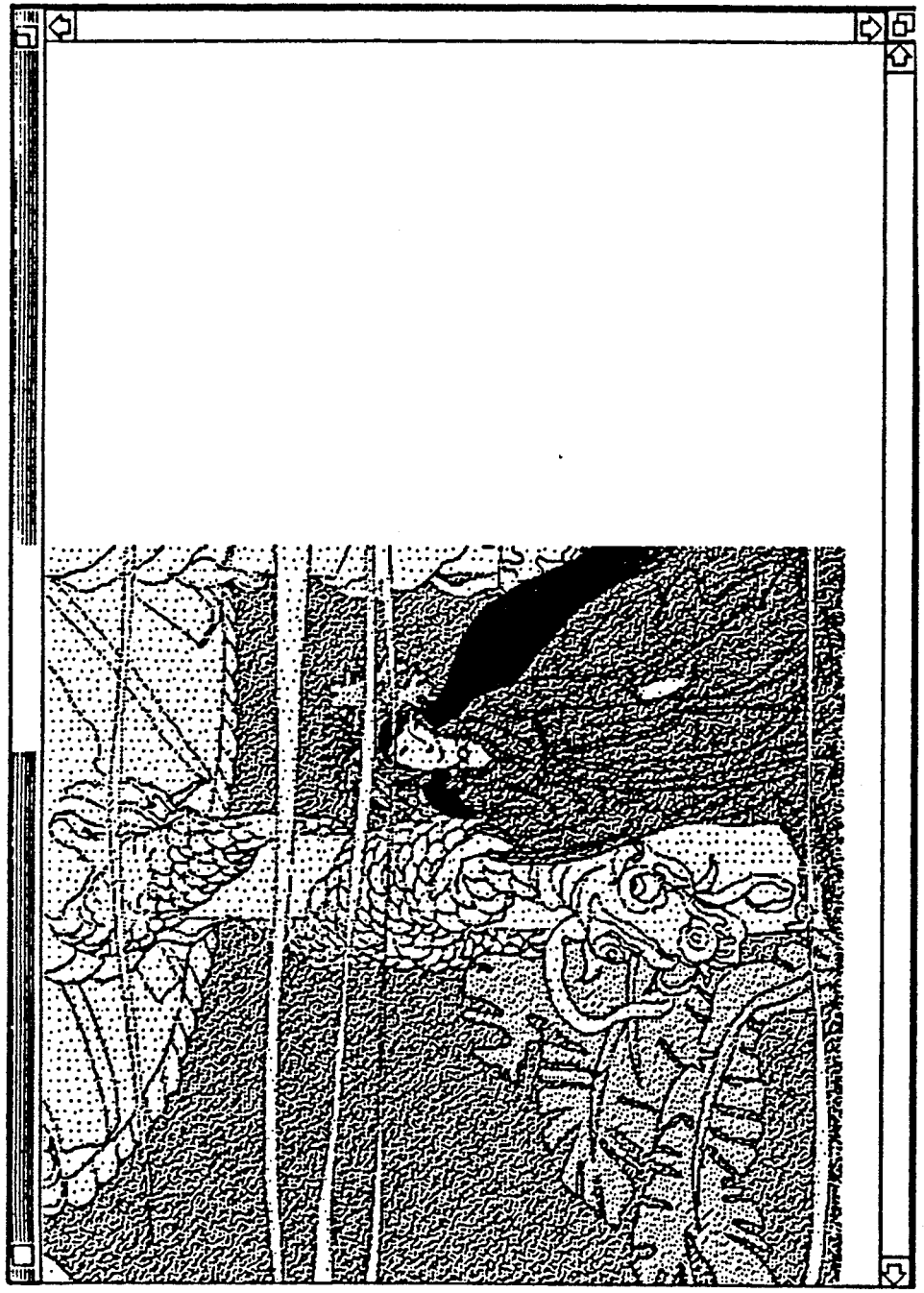
Figure 13:
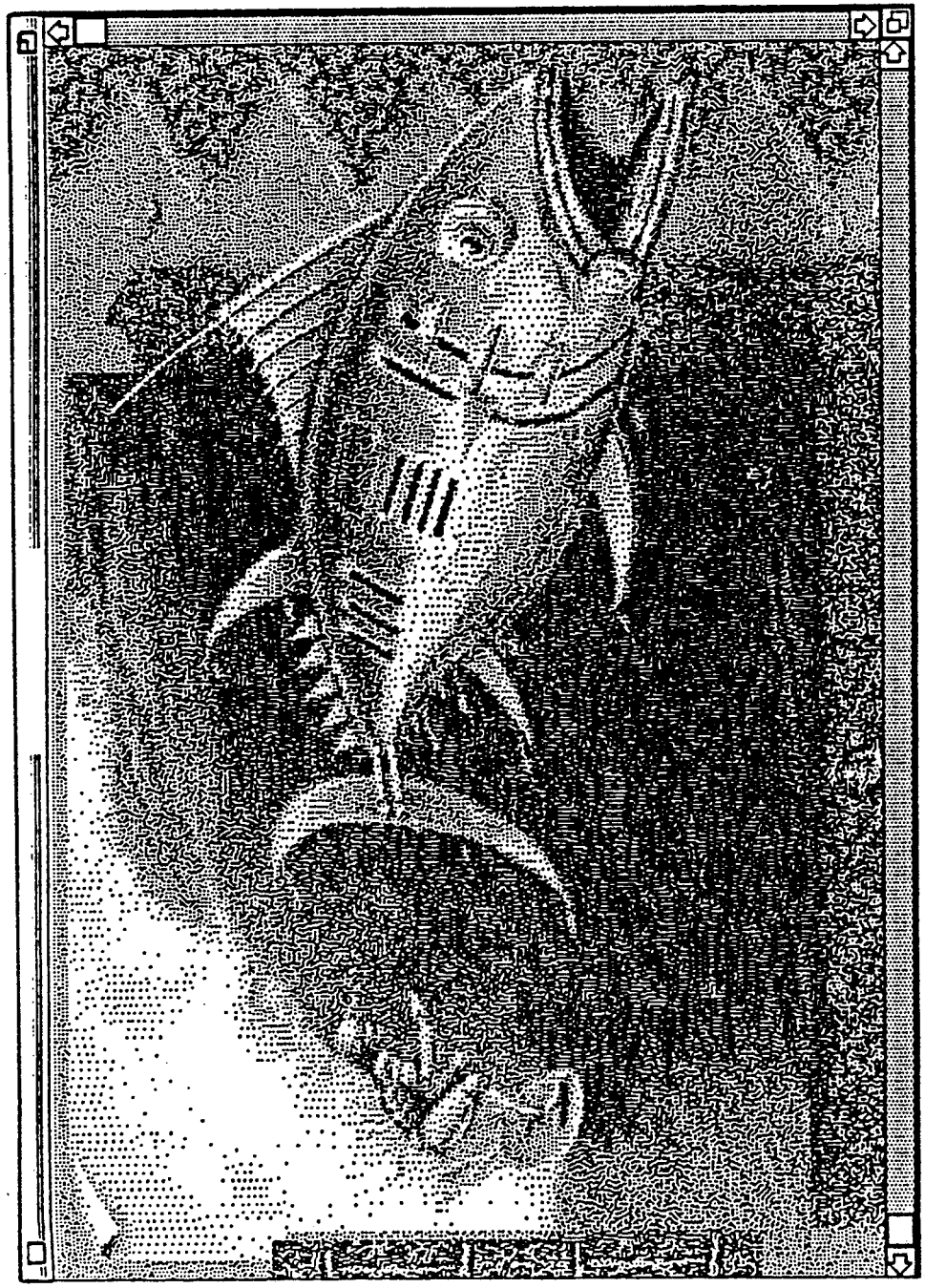
Figure 14:
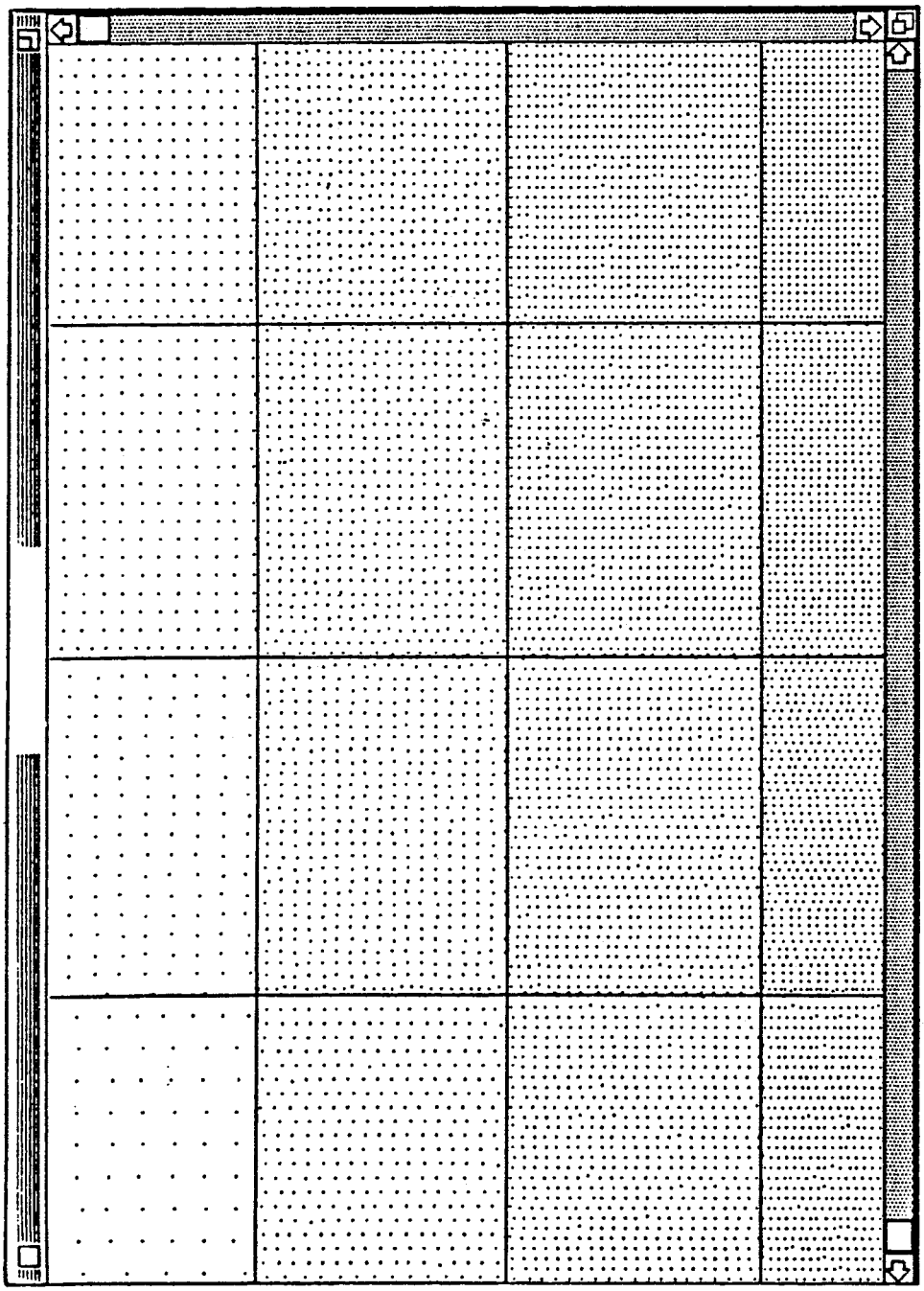
FIG. 14 is composed of 16 bi-level images of 16 different density levels rendered using the invention to illustrate its advantages.

Halftone images achieved using the conventional Floyd and Steinberg system are illustrated in FIGS. 8–10, whereas an error diffusion rendition of the same pictures using this invention are illustrated in FIGS. 11–13. A comparison of the two sets of pictures will illustrate that, for the images produced using the error diffusion scheme of this invention, the highlight and dark portions of the images contain a much more orderly distribution of colored dots, where patterned artifacts or "worms" are not noticeable, in contrast to the highlight and dark areas in the images reproduced using the conventional error diffusion scheme. FIG. 14 is composed of 16 bi-level images of 16 different density levels rendered using the invention to illustrate its advantages.

While the invention has been described above by reference to various embodiments, it will be understood that various modifications and changes may be made without departing from the scope of the invention which is to be limited only by the appended claims.

What is claimed is:

1. An apparatus for converting a multiple level digital or continuous tone original image into a bi-level image, wherein quantization errors in converting density levels of pixels or blocks of pixels of the image are distributed to neighborhood pixels or blocks of pixels, said apparatus comprising:
   a scanner for scanning said original image to detect the density levels of pixels or blocks of pixels within a predetermined range of optical wavelengths;
   means for adding to the density level of each of a plurality of pixels or blocks of pixels scanned an error correction term to provide a corrected density level for said pixel or block of pixels to convert said pixel or block;
   means for comparing the corrected density level of each of said pixels or blocks of pixels to a predetermined threshold, and for providing a bi-level output corresponding to the pixel or block of pixels; and
   means for deriving from the corrected density level of each of said pixels or blocks of pixels and the bi-level output error correction terms of such pixel or block of pixels for distribution to at least two neighborhood pixels or blocks of pixels of such pixel or block of pixels, wherein for at least one converted pixel or block of pixels whose density level or corrected density level is in a predetermined range, the correction term of such pixel or block has a component that varies with respect to the position of the pixel or block of pixels and that is periodic with respect to a wavelength which is a function of the density level or corrected density level of said pixel or block.

2. The apparatus of claim 1, wherein the pixels are arranged in a two-dimensional array with respect to a printing direction, wherein each of said pixels or blocks of pixels and its at least two corresponding neighborhood pixels or blocks of pixels are not collinear.

3. The apparatus of claim 1, said deriving means including an error filter that, for each of said pixels or blocks of pixels whose density levels have been converted and for which correction terms have been derived, distributes to neighborhood pixels or blocks of pixels of such pixel or block correction terms given by weighted portions of the difference between the corrected density level of each of said pixels or blocks of pixels and the bi-level output for such pixel or block.

4. The apparatus of claim 3, wherein said correction terms of a pixel or block are given by the products of weights and said difference for such pixel or block, and wherein for pixels or blocks of pixels whose corrected density levels are in said range, said weights are functions of the corrected density levels of such pixels or blocks.

5. The apparatus of claim 4, wherein said range is defined by values above or equal to a first value and below a second value higher than the first value or by values lower than or equal to a first value and above a second value lower than the first value.

6. The apparatus of claim 5, wherein values of the density and corrected density levels are in the range of 0 to 255, and wherein said first value is about 192 and said second value is about 63.

7. The apparatus of claim 5, wherein for each pixel or block of pixels whose corrected density level is in said range, said weights for said pixel or block of pixels further include components that are substantially equal to the products of said difference and constants.

8. The apparatus of claim 7, wherein for each pixel or block of pixels whose corrected density level is in said range, at least four correction terms of such pixel or block are distributed to neighborhood pixels or blocks of pixels, where said weights for the four correction terms include $w1''$, $w2''$, $w3''$, $w4''$ given by:

$$w_n'' = (1-\text{temp})w_n' + w_n \cdot \text{temp};$$

temp = absolute value of (Pval' − first value)/(first value − second value);
Pval' being the corrected density level of said pixel or block;
$w_n'$ being constants;
where n = 1, 2, 3, 4;
$w_4 = 0.5[\sin(\pi/2 - 2\pi x/\lambda) + 1]$;
$w_1 = 1 - w_4$;
$w_2 = w_3 = 0$;
$x = \lambda/2 - I.\text{mod}\lambda$;
where I is the distance of said pixel or block from a reference axis in a printing direction, and $\lambda$ is the wavelength which is a predetermined function of the density level or corrected density level of said pixel or block.

9. The apparatus of claim 8, wherein $w_1'$, $w_3'$ are substantially equal to 0.3, and $w_2'$, $w_4'$ are substantially equal to 0.2.

10. The apparatus of claim 4, wherein said weights includes expressions that are proportional to a sine function which is periodic with respect to said wavelength.

11. The apparatus of claim 4, wherein for pixels or blocks of pixels whose corrected density levels are outside said range, said weights are substantially constants.

12. The apparatus of claim 11, wherein for each pixel or block of pixels whose corrected density level is outside said range, at least four correction terms of such pixel or block are distributed to neighborhood pixels or blocks of pixels, where said weights for the four correction terms include $w_1''$, $w_2''$, $w_3''$, $w_4''$, wherein $w_1''$, $w_3''$ are substantially equal to 0.3, and $w_2''$, $w_4''$ are substantially equal to 0.2.

13. A method for converting a multiple level digital or continuous tone original image into a bilevel image, wherein quantization errors in converting density levels of pixels or blocks of pixels of the image are distributed to neighborhood pixels or blocks of pixels, said method comprising:

scanning said original image to detect the density levels of pixels or blocks of pixels within a predetermined range of optical wavelengths;

adding to the density level of each of a plurality of pixels or blocks of pixels scanned an error correction term to provide a corrected density level for said pixel or block of pixels to convert said pixel or block;

comparing the corrected density level of each of said pixels or blocks of pixels to a predetermined threshold, and providing a bi-level output corresponding to the pixel or block of pixels; and deriving from the corrected density level of each of said pixels or blocks of pixels and the bi-level output error correction terms of such pixel or block of pixels for distribution to at least two neighborhood pixels or blocks of pixels of such pixel or block of pixels, wherein for at least one converted pixel or block of pixels whose density level or corrected density level is in a predetermined range, the correction term of such pixel or block has a component that varies with respect to the position of the pixel or block of pixels and that is periodic with respect to a wavelength which is a function of the density level or corrected density level of said pixel or block.

14. The method of claim 13, for each of said pixels or blocks of pixels whose density levels have been converted and for which correction terms have been derived, said deriving step including the step of distributing to neighborhood pixels or blocks of pixels of such pixel or block correction terms given by weighted portions of the difference between the corrected density level of each of said pixels or blocks of pixels and the bi-level output for such pixel or block.

15. The method of claim 14, wherein said distributing step includes multiplying weights and said difference for such pixel or block to obtain correction terms of such pixel or block, and wherein for pixels or blocks of pixels whose corrected density levels are in said range, said weights are functions of the corrected density levels of such pixels or blocks.

16. The method of claim 15, wherein said range is defined by values above or equal to a first value and below a second value higher than the first value or by values lower than or equal to a first value and above a second value lower than the first value.

17. The method of claim 16, wherein values of the density and corrected density levels are in the range of 0 to 255, and wherein said first value is about and said second value is about 63.

18. The method of claim 16, wherein for each pixel or block of pixels whose corrected density level is in said range, said weights for said pixel or block of pixels further include components that are substantially equal to the products of said difference and constants.

19. The method of claim 18, wherein for each pixel or block of pixels whose corrected density level is in said range, at least four correction terms of such pixel or block are distributed to neighborhood pixels or blocks of pixels, where said weights for the four correction terms include $w_1''$, $w_2''$, $w_3''$, $w_4''$ given by:

$$w_n'' = (1-\text{temp})w_n' + w_n \cdot \text{temp};$$

temp = absolute value of (Pval' − first value)/(first value − second value);

Pval' being the corrected density level of said pixel or block;

$w_n'$ being constants;

where n = 1, 2, 3, 4;

$w_4 = 0.5 [\sin(\pi/2 - 2\pi x/\lambda + 1];$ $w_1 = 1 - w_4;$ $w_2 = w_3 = 0;$ $x = \lambda/2 - I.\text{mod}\lambda;$ where I is the distance of said pixel or block from a reference axis in a printing direction, and $\lambda$ is the wavelength which is a predetermined function of the density level or corrected density level of said pixel or block.

20. The method of claim 19, wherein $w_1'$, $w_3'$ are substantially equal to 0.3, and $w_2'$, $w_4'$ are substantially equal to 0.2.

21. The method of claim 16, wherein said weights includes expressions that are proportional to a sine function which is periodic with respect to said wavelength.

22. The method of claim 16, wherein for pixels or blocks of pixels whose corrected density levels are outside said range, said weights are substantially constants.

23. The method of claim 22, wherein for each pixel or block of pixels whose corrected density level is outside said range, at least four correction terms of such pixel or block are distributed to neighborhood pixels or blocks of pixels, where said weights for the four correction terms include $w_1''$, $w_2''$, $w_3''$, $w_4''$, wherein $w_1''$, $w_3''$ are substantially equal to 0.3, and $w_2''$, $w_4''$ are substantially equal to 0.2.

* * * * *

UNITED STATES PATENT AND TRADEMARK OFFICE
CERTIFICATE OF CORRECTION

PATENT NO. : 5,130,823
DATED : JULY 14, 1992
INVENTOR(S) : HARRY BOWERS

It is certified that error appears in the above-identified patent and that said Letters Patent is hereby corrected as shown below:

Column 11, line 19, in Claim 13:  replace "bilevel" with --bi-level--

Column 12, line 12, in Claim 17:  insert --192-- after "about"

Signed and Sealed this

Twenty-third Day of November, 1993

Attest:

BRUCE LEHMAN

*Attesting Officer*     *Commissioner of Patents and Trademarks*